US010422627B2

(12) United States Patent
Georgeson et al.

(10) Patent No.: US 10,422,627 B2
(45) Date of Patent: Sep. 24, 2019

(54) SYSTEMS AND METHODS FOR PROJECTED GRID-BASED LOCATION TRACKING

(71) Applicant: The Boeing Company, Chicago, IL (US)

(72) Inventors: Gary E. Georgeson, Tacoma, WA (US); James J. Troy, Issaquah, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/206,313

(22) Filed: Nov. 30, 2018

(65) Prior Publication Data
US 2019/0107382 A1 Apr. 11, 2019

Related U.S. Application Data

(62) Division of application No. 14/993,202, filed on Jan. 12, 2016, now Pat. No. 10,145,670.

(51) Int. Cl.
G01B 11/14 (2006.01)
G01B 11/00 (2006.01)
G01S 5/16 (2006.01)

(52) U.S. Cl.
CPC .............. *G01B 11/002* (2013.01); *G01S 5/16* (2013.01); *G01S 5/163* (2013.01)

(58) Field of Classification Search
CPC .... G06K 9/3241; G06K 9/3216; G01S 17/46; G01S 17/88; G01S 5/16; G01B 11/00; G01B 11/002; G01B 7/003; G01B 7/14

USPC .................................................. 356/601–623
See application file for complete search history.

(56) References Cited

U.S. PATENT DOCUMENTS

| 4,453,085 | A | 6/1984 | Pryor |
| 4,725,146 | A | 2/1988 | Hutchin |
| 4,769,700 | A | 9/1988 | Pryor |
| 4,823,062 | A | 4/1989 | Hoffman et al. |
| 6,055,056 | A | 4/2000 | Kuehmstedt et al. |
| 7,859,655 | B2 | 12/2010 | Troy et al. |
| 8,738,226 | B2 | 5/2014 | Troy et al. |
| 8,892,252 | B1 | 11/2014 | Troy et al. |
| 9,043,146 | B2 | 5/2015 | Troy et al. |
| 9,197,810 | B2 | 11/2015 | Troy et al. |
| 9,221,506 | B1 | 12/2015 | Georgeson et al. |

(Continued)

*Primary Examiner* — Hoa Q Pham
(74) *Attorney, Agent, or Firm* — Ostrager Chong Flaherty & Broitman, P.C.

(57) ABSTRACT

Systems and methods that provide a framework for location tracking of a movable target component or device (e.g., an automated device or a hand-operated device) to accurately cover an area of interest along a specified path or in a specified region. Grid patterns are projected onto a surface of a workpiece or a part. The projected grid lines may be straight or curved. Straight grid lines can be parallel or intersecting. The grid pattern may include a path to be followed. The lines of the projected grid pattern are detected by a grid detection sensor which is mounted onboard the movable target component or device. Information from the grid detection sensor is fed to a location mapping program. The systems and methods also enable navigation for use in automated and autonomous manufacturing and maintenance operations, as well as other tracking-based applications.

23 Claims, 14 Drawing Sheets

(56) References Cited

U.S. PATENT DOCUMENTS

| | | | |
|---|---|---|---|
| 9,633,439 B2* | 4/2017 | Sagawa | G01B 11/2513 |
| 10,145,670 B2* | 12/2018 | Georgeson | G01B 11/002 |
| 10,267,626 B2* | 4/2019 | Morimoto | G01B 11/2513 |
| 2014/0278221 A1 | 9/2014 | Troy et al. | |

* cited by examiner

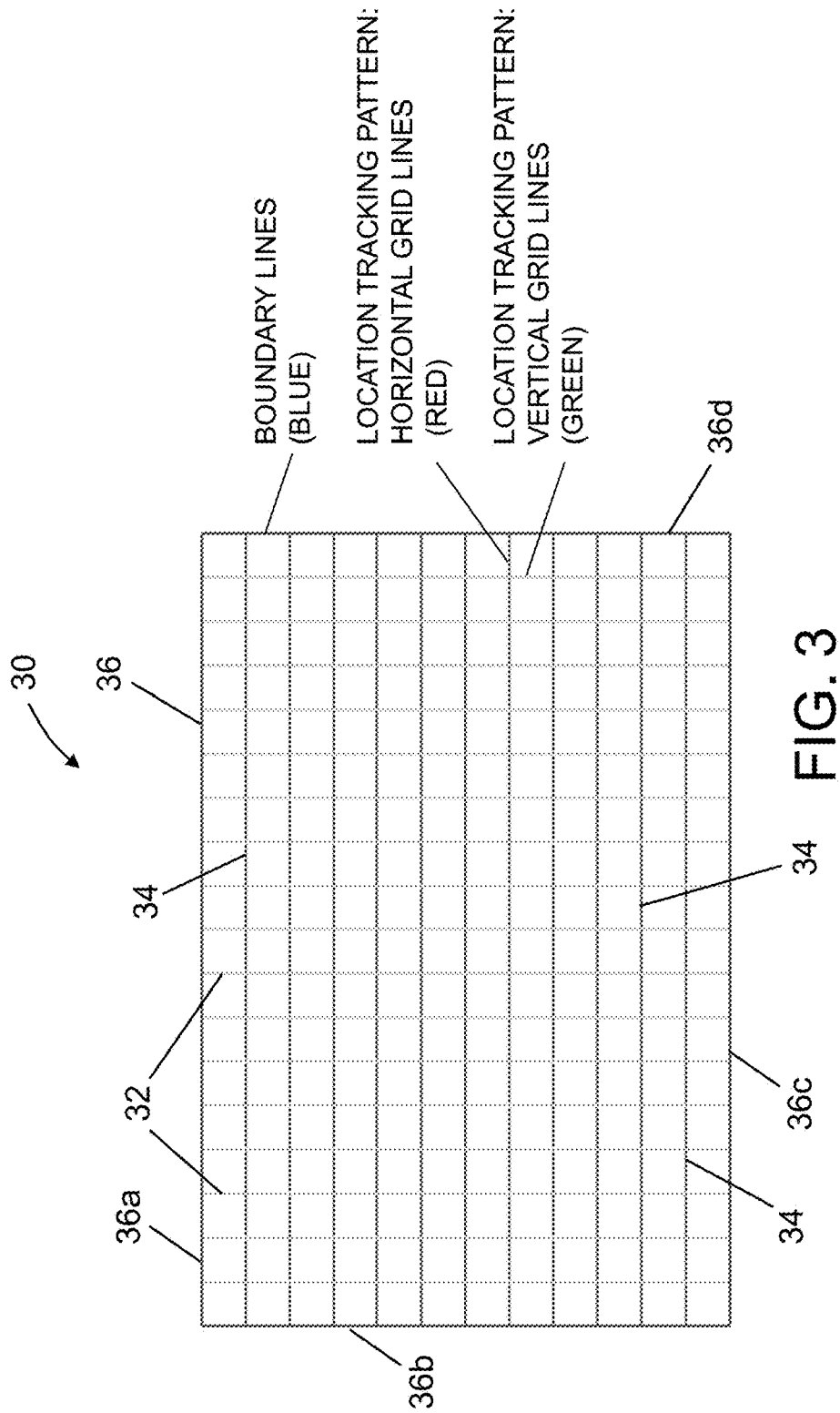

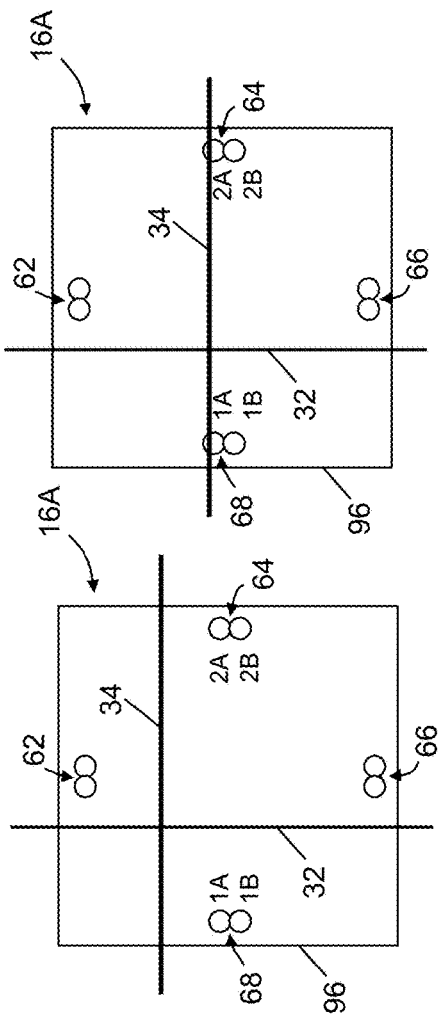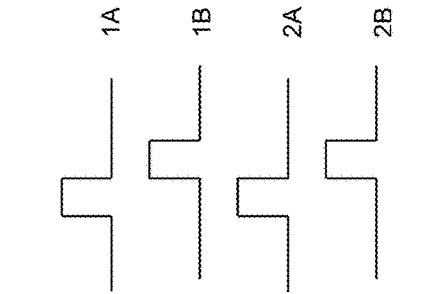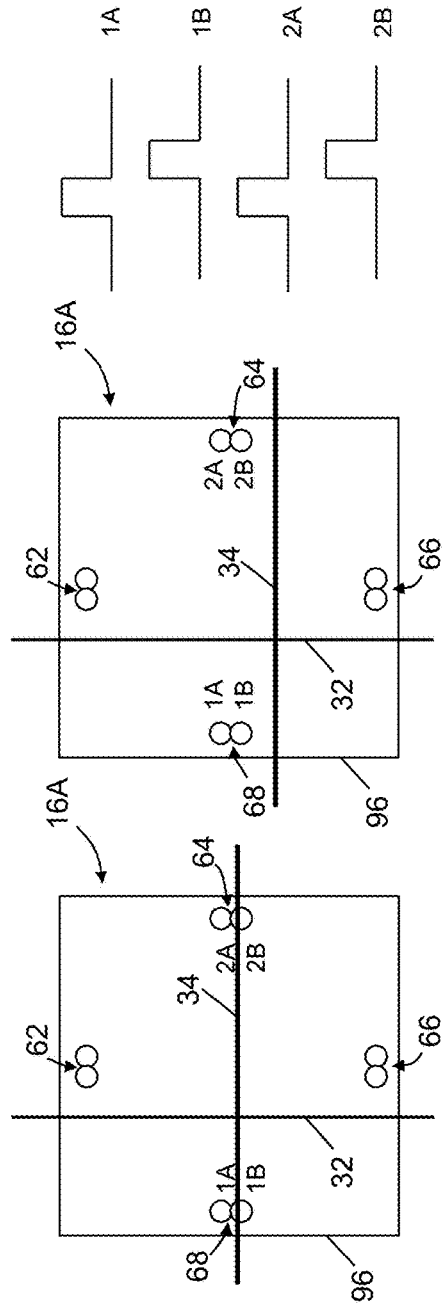

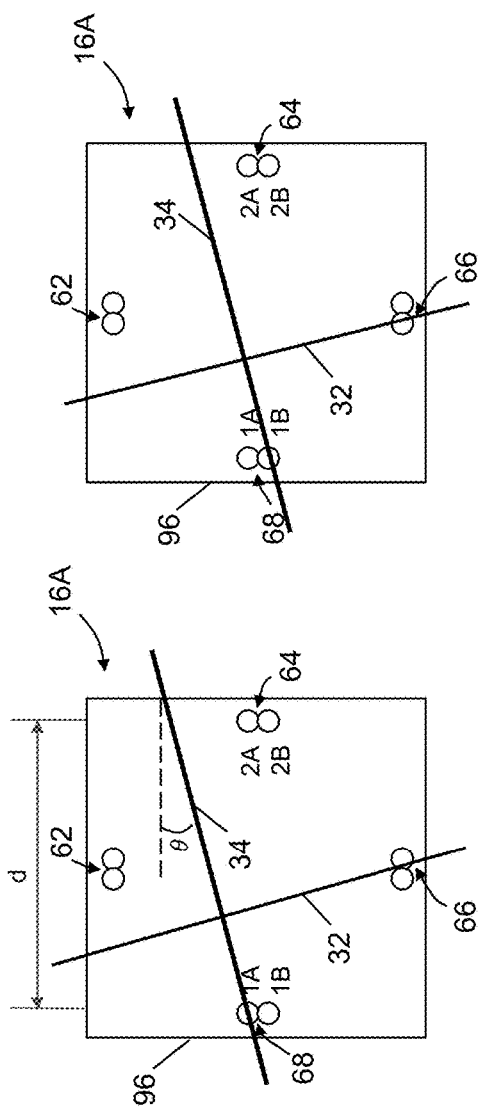
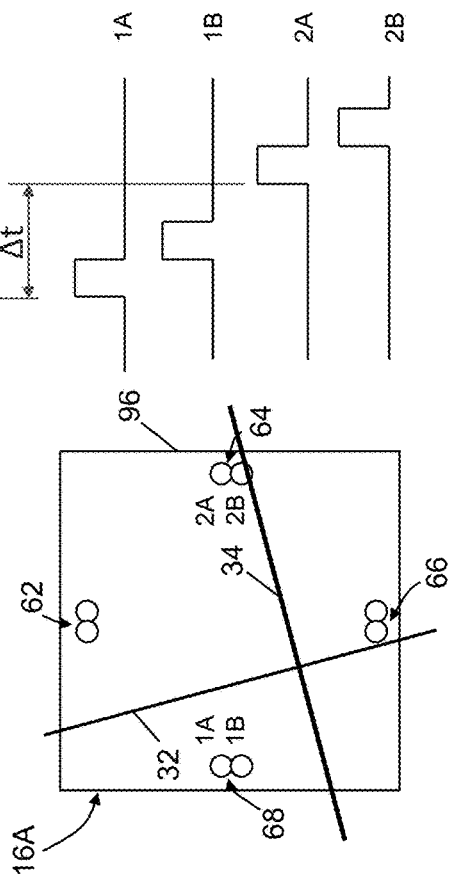
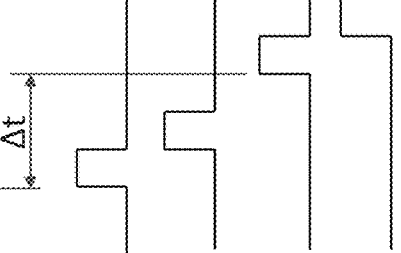
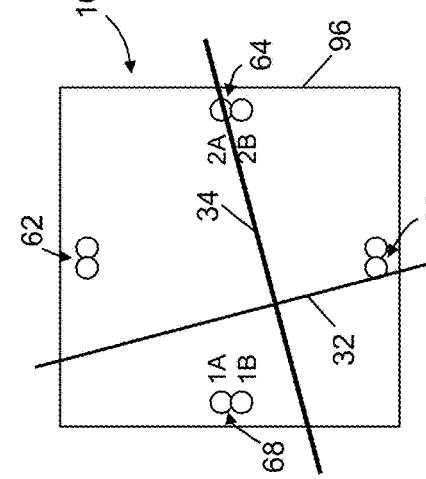

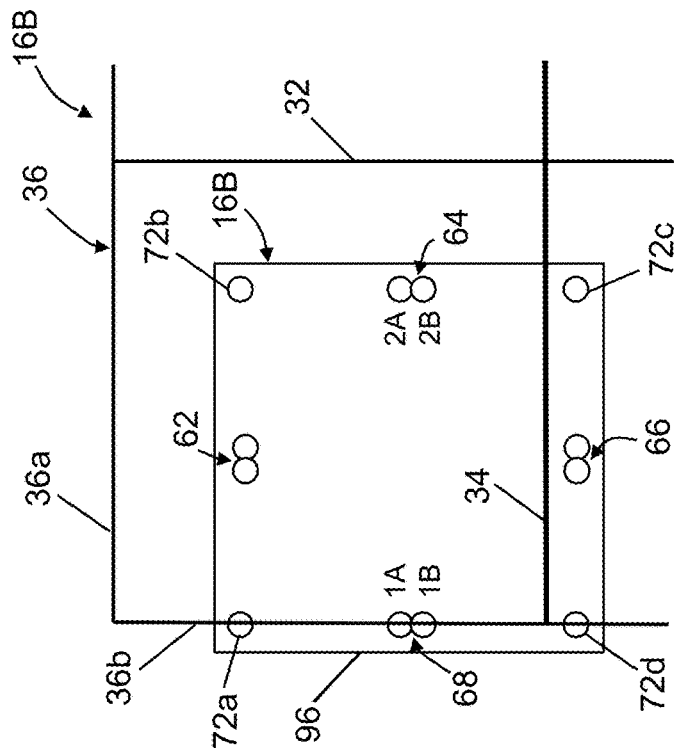
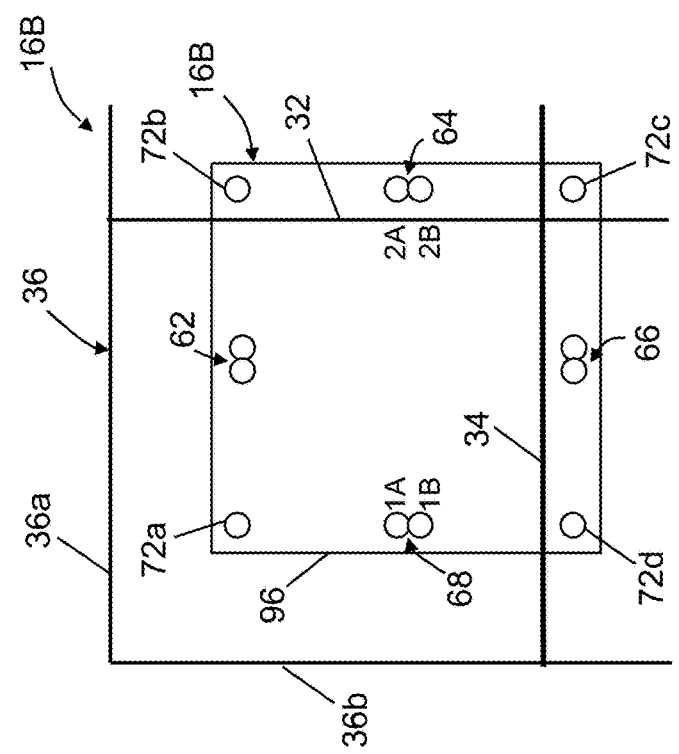

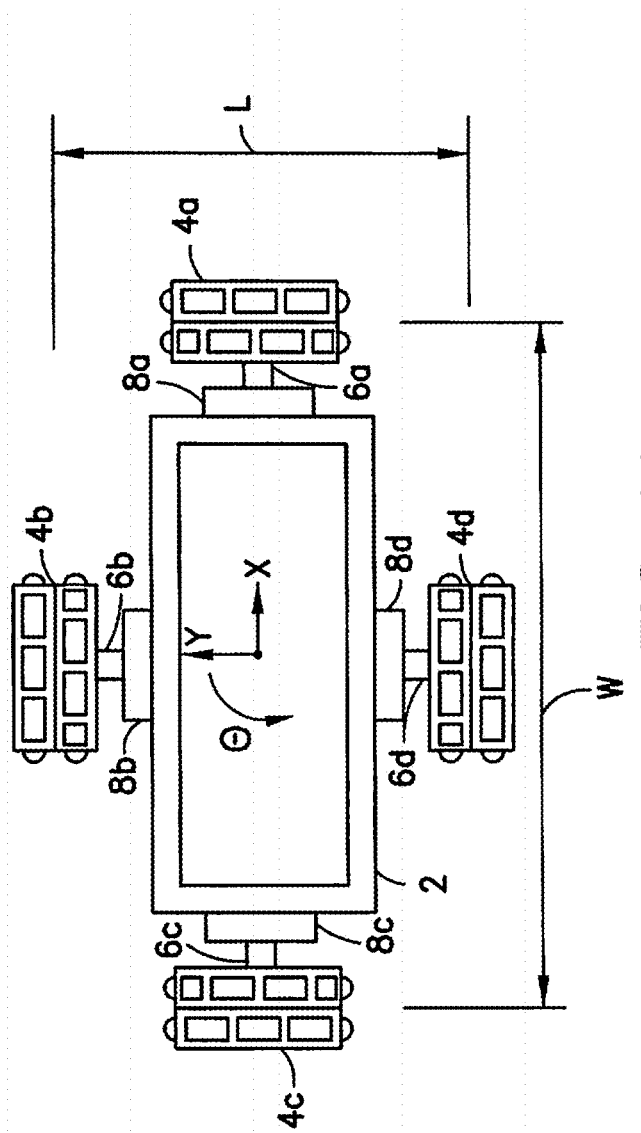

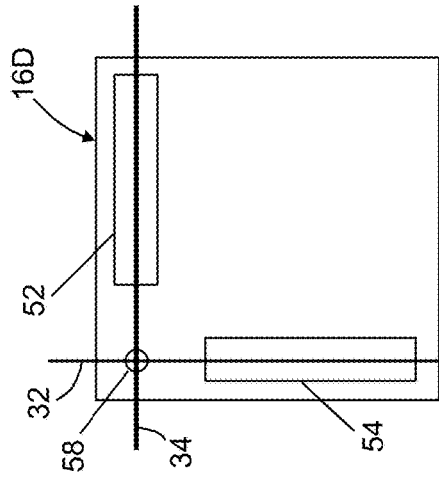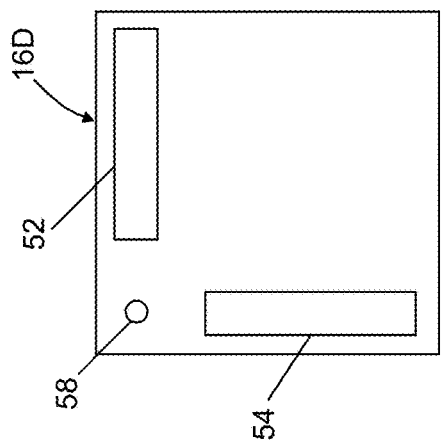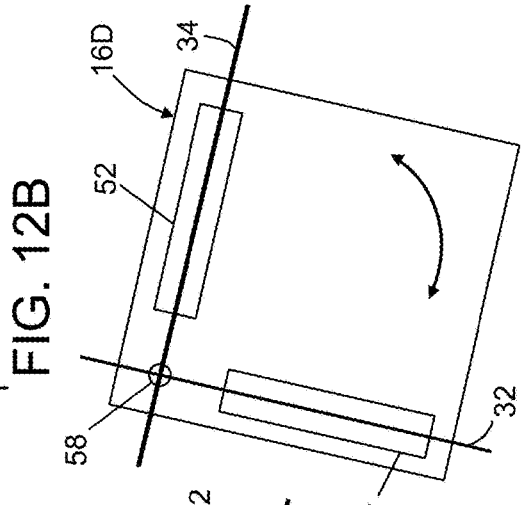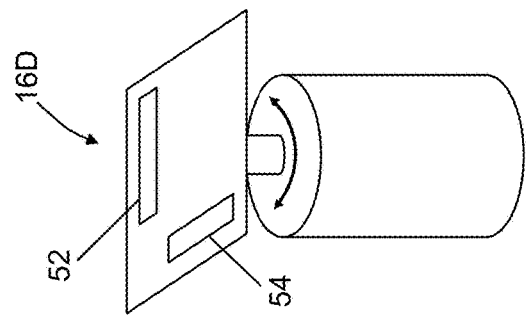

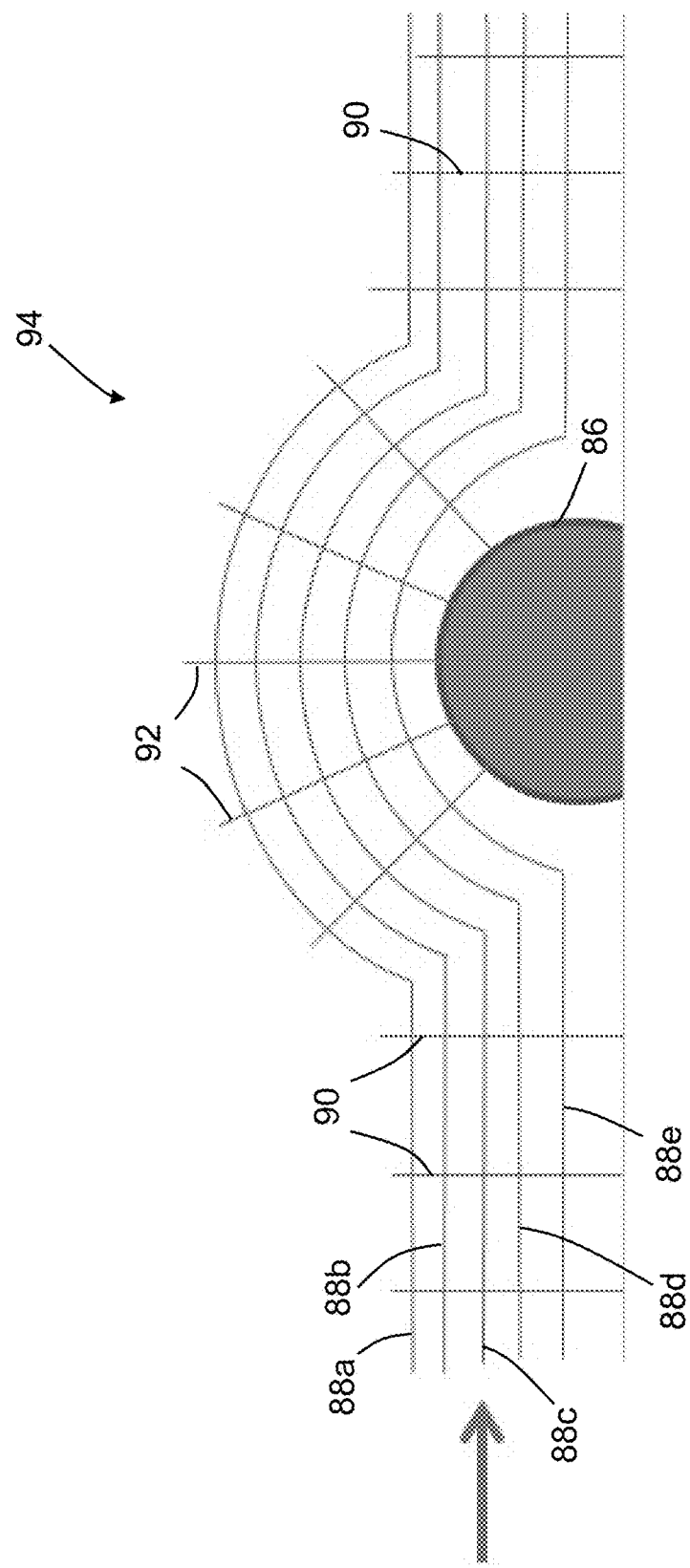

SYSTEMS AND METHODS FOR PROJECTED GRID-BASED LOCATION TRACKING

RELATED PATENT APPLICATION

This application is a divisional of and claims priority from U.S. patent application Ser. No. 14/993,202 filed on Jan. 12, 2016, which issued as U.S. Pat. No. 10,145,670 on Dec. 4, 2018.

BACKGROUND

This disclosure generally relates to systems and methods for tracking the locations of a movable target object (e.g., a component of an automated apparatus or a hand-operated device that requires accurate location tracking) as it moves relative to a workpiece or part.

An aircraft is subjected to a variety of manufacturing and maintenance operations throughout its long lifetime. These operations include non-destructive inspection, surface preparation, painting, coating, repair, cleaning, paint removal, re-painting, re-coating, among others. All of these operations would benefit from the cost, time, quality, and personnel safety improvements that crawling, swarming, or flying autonomous or semi-autonomous robots can provide. While autonomous technology is moving in this direction, a limitation is the cost and complexity associated with tracking and guidance of platforms across the surface of the structure.

Applications involving manufacturing and maintenance processes that use crawler vehicles or other computer-controlled electro-mechanical machines often employ location tracking in a reference coordinate system. Existing location tracking solutions fit into two categories: absolute motion tracking and incremental motion tracking. Absolute motion tracking refers to tracking of position and/or orientation defined in a reference coordinate system, such as an airplane coordinate system. Known techniques for absolute motion tracking include optical motion capture, laser tracking, depth cameras, magnetic tracking, sonic-based tracking, and tracking using the Global Positioning System (GPS).

Incremental motion tracking measures displacements relative to a prior coordinate measurement. One known technique for incremental motion tracking employs encoders which output pulses in response to incremental movements. In applications that use incremental motion measurement, errors can build up over time. Such error build-up is undesirable in use cases requiring finite error with respect to an absolute coordinate system. The magnitude of the error can be reduced by implementing a process that provides accurate, absolute measurement at lower update rates which can be integrated into an incremental motion measurement system running at higher update rates.

It would be advantageous to provide a system and a method for location tracking of a movable target object during manufacturing and maintenance procedures that is simple and inexpensive.

SUMMARY

The subject matter disclosed in detail below is directed to systems and methods that provide a structured approach/framework for location tracking of a movable target component or device (e.g., a crawler vehicle, an articulated robot arm or a hand-operated device) to accurately cover an area of interest along a specified path or in a specified region. These systems and methods involve the projection of grid patterns onto a surface of a workpiece or a part. The projected grid lines may be straight or curved. Straight grid lines can be parallel or intersecting. The grid pattern may include a path to be followed. The lines of the projected grid pattern are detected by a grid detection sensor which is mounted onboard the movable target component or device being tracked. Information from the grid detection sensor is fed to a location mapping program. The systems and methods disclosed below also enable a relatively simple form of navigation for use in automated and autonomous manufacturing and maintenance operations, as well as other tracking-based applications.

The location tracking apparatus comprises a grid pattern projection unit (also referred to herein as a "projector") and a grid-line detection unit (also referred to herein as a "grid-line detector"). The grid patterns can comprise closely spaced lines that provide adequate spatial resolution or lines that are separated by large gaps that provide coarse position, with fine position being determined using differential odometry, encoder data, inertial sensing, etc.

Projection of the appropriate pattern onto the surface can be utilized by an automated apparatus (hereinafter "robot") for location tracking and verification, which significantly reduces the cost and complexity of tracking for automated/autonomous manufacturing and maintenance. Any kind of robotic device can use the technology disclosed herein for location tracking, including a surface crawling robot, a hovering robot, a pedestal robot having an articulated robotic arm, or an X-Y-Z scanning bridge. Grid pattern projection can also be used to track the location of devices which are movable manually.

The grid pattern projection unit may take the form of a multi-color projection device that generates mutually perpendicular sets of grid lines. For this application, the pattern is projected generally perpendicular to the surface of the workpiece or part on or over which the tracked device or component (automated or hand-operated) moves. The horizontal and vertical grid lines are disambiguated by using different colors. In accordance with some methods of operation, the grid pattern will be aligned with some visible features on the surface of a workpiece or part, and can be adjusted with standard projection adjustments (keystone, zoom, etc.).

The grid-line detection unit may take the form of a grid-line detection unit having sets of photo-sensors designed to detect the different colors of the projected grid lines. Digital output from the grid-line detection unit can be used to determine the X-Y position and heading angle of the tracked device or component relative to the grid pattern. The X-Y position aspect works in a similar way to a standard linear encoder by counting pulses, and the angle calculation uses sensor element separation distances, velocity, and variation in the time of receipt of the pulses in order to determine heading angle. The grid-line detection unit may further comprise boundary region sensors which are sensitive to the specific color of the projected border lines.

One aspect of the subject matter disclosed in detail below is a system comprising: a movable target component; a projector configured to project a grid pattern comprising intersecting grid lines and located to project the grid pattern toward the movable target component; a grid-line detection unit mechanically coupled to the movable target component, the grid-line detection unit comprising at least two photo-sensors, each photo-sensor being configured to output a signal when an impinging grid line is detected; a data acquisition device to convert the signals from the photo-sensors into signal data in a digital format; and a computer system configured to calculate a location of the movable target component based on the signal data from the data acquisition device. In some embodiments, the computer system is further configured to control movement of the movable target component as a function of the calculated location of the movable target component.

Another aspect of the subject matter disclosed in detail below is a method for tracking a location of a movable target component, the method comprising: mechanically coupling a grid-line detection unit having multiple photo-sensors to the movable target component; projecting light toward the grid-line detection unit, the projected light being in the form of a grid pattern comprising intersecting grid lines; moving the grid-line detection unit relative to the grid pattern; outputting electrical signals from the photo-sensors having characteristics indicative of projected light of the grid pattern sensed by individual photo-sensors during movement of the grid-line detection unit; and tracking a current location of the grid-line detection unit relative to the grid pattern using digital data derived from the electrical signals output by the photo-sensors. This method may further comprise computing a current location of the movable target component relative to a frame of reference of a workpiece or part based on at least a location of the grid pattern relative to the frame of reference of the workpiece or part and a current location of the grid-line detection unit relative to the grid pattern.

In accordance with some embodiments, the method described in the preceding paragraph further comprises: comparing the current location of the movable target component to a target location of the movable target component; causing the movable target component to move toward the target location; mechanically coupling a tool to the robotic apparatus; and using the tool to perform a manufacturing or maintenance operation on the workpiece or part while the component of the robotic apparatus is located at the target location. In accordance with other embodiments, the method described in the preceding paragraph further comprises: equipping the movable target component with a non-destructive inspection probe; using the non-destructive inspection probe to acquire non-destructive inspection data from the workpiece or part while the movable target component is at its current location; and mapping the acquired non-destructive inspection data to location data representing the current location of the movable target component in a non-transitory tangible computer-readable medium.

A further aspect is an apparatus comprising a movable target component, a tool mechanically coupled to the movable target component, and a grid-line detection unit mechanically coupled to the movable target component, wherein the grid-line detection unit comprises a substrate, first through fourth photo-sensors that detect light having a first color and do not detect light having a second color different than the first color, and fifth through eight photo-sensors that detect light having the second color and do not detect light having the first color, the first and second photo-sensors being disposed adjacent to each other on a surface of the substrate and away from the other photo-sensors, the third and fourth photo-sensors being disposed adjacent to each other on the surface of the substrate, away from the other photo-sensors and opposite to the first and second photo-sensors, the fifth and sixth photo-sensors being disposed adjacent to each other on the surface of the substrate and away from the other photo-sensors, and the seventh and eighth photo-sensors being disposed adjacent to each other on the surface of the substrate, away from the other photo-sensors and opposite to the fifth and sixth photo-sensors. In some embodiments, the substrate has first through fourth corners, and the grid-line detection unit further comprises ninth through twelfth photo-sensors that detect light having a third color different than the first and second colors and do not detect light having the first and second colors. In such embodiments, the first through eighth photo-sensors do not detect light having the third color.

Other aspects of systems and methods for location tracking of movable target components are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 3 is a diagram representing a projected grid pattern consisting of vertical grid lines in a first color, horizontal grid lines in a second color, and boundary lines in a third color.

FIGS. 5A through 5D are diagrams representing a top view of a solid-state grid-line detection unit in accordance with one embodiment. These diagrams depict successive positions of the grid-line detection unit as it moves vertically upward with a rotation angle of zero relative to a pair of stationary mutually perpendicular grid lines which are being projected onto a workpiece or part.

FIG. 5E is a diagram indicating the timing of pulses generated by two pairs of photo-sensors of the grid-line detection unit during movement of the grid-line detection unit relative to the grid lines as depicted in FIGS. 5A through 5D.

FIGS. 6A through 6D are diagrams representing a top view of a grid-line detection unit in accordance with one embodiment. These diagrams depict successive positions of the grid-line detection unit as it moves vertically upward with a non-zero rotation angle relative to a pair of stationary mutually perpendicular grid lines which are being projected onto a workpiece or part.

FIG. 6E is a diagram indicating the timing of pulses generated by two pairs of photo-sensors of the grid-line detection unit during movement of the grid-line detection unit relative to the grid lines as depicted in FIGS. 6A through 6D.

FIGS. 7A and 7B are diagrams representing a top view of a grid-line detection unit having boundary sensors in accordance with another embodiment. These diagrams depict successive positions of the grid-line detection unit as it moves rightward with a rotation angle of zero relative to a stationary boundary line which is being projected onto a workpiece or part.

FIG. 11 is a diagram representing top view of some components of a known encoder-equipped hand-operated device whose incremental movements can be tracked using a dead-reckoning odometry-based process.

FIG. 12 is a diagram representing an isometric view of an oscillating/rotating grid-line detection unit having two photo-sensors for grid-line detection in accordance with one alternative embodiment.

FIG. 12A is a diagram representing a top view of the grid-line detection unit depicted in FIG. 12.

FIG. 12B is a diagram representing a top view of the grid-line detection unit depicted in FIG. 12 at an instant in time when two projected grid lines are respectively aligned with the linear photo-sensors.

FIG. 12C is a diagram representing a top view of the grid-line detection unit depicted in FIG. 12B after the robot has rotated relative to the projected grid pattern.

FIG. 12D is a diagram representing a top view of the grid-line detection unit depicted in FIG. 12C at an instant in time during oscillation/rotation when two projected grid lines are respectively aligned with the linear photo-sensors.

FIG. 14 is a diagram representing a top view of a grid pattern that incorporates a track for guiding a crawler robot or robotic arm around a structural feature to be avoided.

Reference will hereinafter be made to the drawings in which similar elements in different drawings bear the same reference numerals.

DETAILED DESCRIPTION

Illustrative embodiments of a location tracking system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, location tracking for the purpose of feedback control of robotic apparatus such as crawler robots and articulated robot arms will be described in detail below. However, the concept of using a projected grid pattern to track the location of a movable target component can also be used for measurement (mapping) purposes. The latter mapping application encompasses location tracking of hand-operated devices as well as location tracking of components of automated apparatus such as robots.

Figure 1A:
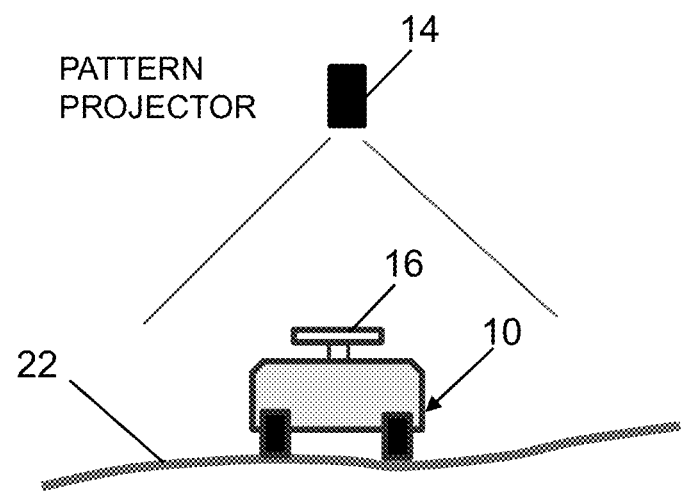
FIG. 1A is a diagram representing an end view of a grid projection/detection system for tracking a crawler robot that is moving on a surface of a workpiece or part that is relatively horizontal.
Figure 1B:
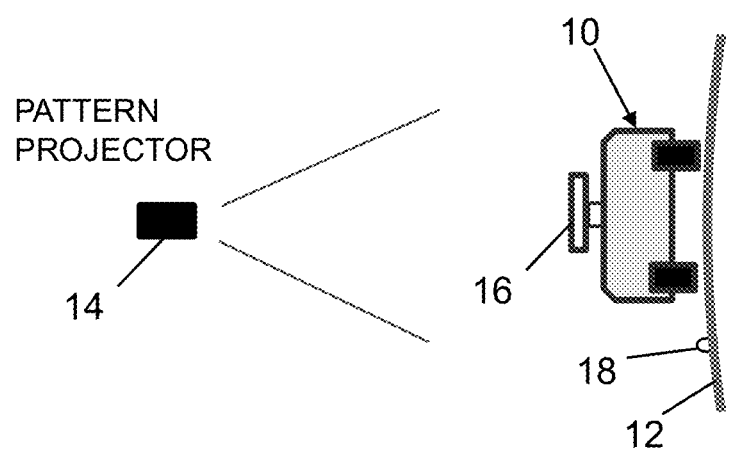
FIG. 1B is a diagram representing an end view of a grid projection/detection system for tracking a crawler robot that is moving on a surface of a workpiece or part that is relatively vertical.

FIG. 1A depicts a grid projection/detection system for tracking a crawler robot 10 that is moving on a relatively horizontal surface 22 of a workpiece or part. FIG. 1B shows the same grid projection/detection system for tracking the crawler robot 10 when it is moving on a relatively vertical surface 12 of a workpiece or part.

As seen in FIGS. 1A and 1B, the grid projection/detection system comprises a grid pattern projector 14 (hereinafter "projector 14") that projects a grid of lines toward the surface of the workpiece or part and a grid-line detection unit 16 that detects when a projected grid line impinges on any photo-sensor (not shown in FIGS. 1A and 1B) of the grid-line detection unit 16.

Patterns are projected into the space that the crawler robot 10 functions in, and picked up by photo-sensors of the grid-line detection unit 16 which is mounted on the crawler robot 10. These patterns can be made of visible light from a laser projector or standard (non-laser) color video projector, IR or UV, or other non-visible light. The crawler robot 10 can have encoder wheels or an inertial sensor to assist in incremental tracking when the photo-sensors are between grid lines. Information from the grid-line detection unit 16 is fed into a position/orientation mapping program that is hosted on a computer (not shown in FIGS. 1A and 1B), such as an expert workstation at an operational command center. The pattern can have optional locating features that can be positioned over known features (such as feature 18 in FIG. 1B) on the workpiece or part (by expanding, rotating, or translating the projection until there is a fit with known locations) for direct correlation of the pattern to a CAD model of the workpiece or part.

The grid-line detection unit 16 is oriented generally toward the projector 14. The pattern can be sensed using any one of various image sensors (a photo-sensor or photo-detector array, a CCD image sensor, a CMOS image sensor, etc.).

Multiple grid-line detection units can work simultaneously within the grid projection area. In some embodiments, each vehicle or device may have its own grid-line detection unit and work independently of the others. In other embodiments, the vehicles or devices may be part of a larger centralized system.

Figure 2:
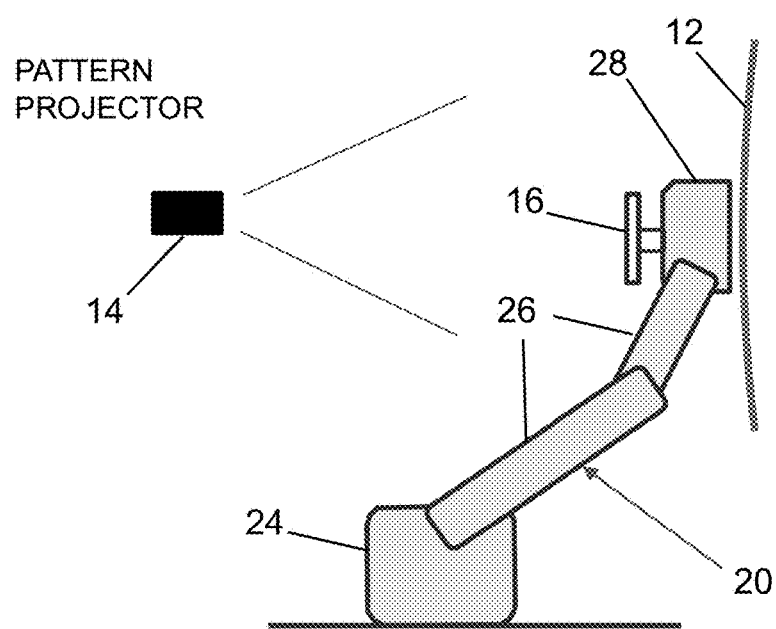
FIG. 2 is a diagram representing a side view of a grid projection/detection system for tracking a head of a robotic arm that is moving relative to a surface of a workpiece or part.

FIG. 2 depicts a grid projection/detection system for tracking the target component 28 (e.g., an end effector) of a robot 20 as the target component 28 moves across a relatively vertical surface 12 of a workpiece or part. The target component 28 may be mounted on a distal end of an articulated robotic arm 26, a proximal end of the robotic arm 26 being attached to a pedestal 24. The grid projection/detection system may be the same system previously described with reference to FIGS. 1A and 1B.

In the scenario depicted in FIG. 2, patterns are projected by the projector 14 into the space that the target component 28 functions in, and picked up by a grid-line detection unit 16 mounted on the target component 28. Information from the grid-line detection unit 16 is fed into a position/orientation mapping program.

As described previously, the projected grid patterns can be made of visible light from a laser projector, IR or UV, or other non-visual light. In some embodiments, pulsed light can be used. For example, the system may comprise three lasers, with the same color, each having a different pulsed frequency that the grid-line detection unit 16 would detect.

The signal-to-noise ratio would be better if looking for specific frequencies from a single red laser that the photocell could be more sensitive too as opposed to various color lasers. This would also be useful in bright sunlight when trying to detect with the photosensitive elements.

In accordance with some embodiments of the apparatus proposed herein, the grid pattern of colored lines is generated by a multi-color projector. In many cases the pattern should be projected approximately perpendicular to the surface of the workpiece or part on or over which the robot will move. For calibrated tracking, the pattern may need to be aligned with some visible features on the target surface, and potentially adjusted with standard projection adjustments based on measured or modeled geometry and projector position and orientation.

One concept presented here uses a regularly spaced projected pattern for real-time tracking, as part of a navigation system for automated/autonomous systems. One basic pattern comprises two mutually perpendicular sets of mutually parallel grid lines wherein the horizontal and vertical grid lines are projected in different colors. In a preferred embodiment, the system includes a projector capable of projecting in at least three colors: red, green, and blue. The grid-line detection unit 16 has photosensitive elements that are sensitive to specific colors. The three projected colors are associated with different lines of the projected grid pattern 30 and will be used by the control system to provide position and orientation data as well as boundary regions.

FIG. 3 is a diagram representing a projected grid pattern 30 consisting of straight vertical grid lines 32 in a first color (e.g., green), straight horizontal grid lines 34 in a second color (e.g., red), and straight boundary lines 36a-36d that form a border 36 in a third color (e.g., blue). In this configuration, the border 36 is a rectangle, the vertical grid lines 32 are evenly spaced and extend from boundary line 36a to boundary line 36c, and the horizontal grid lines 34 are evenly spaced and extend from boundary line 36b to boundary line 36d.

Figure 4B:
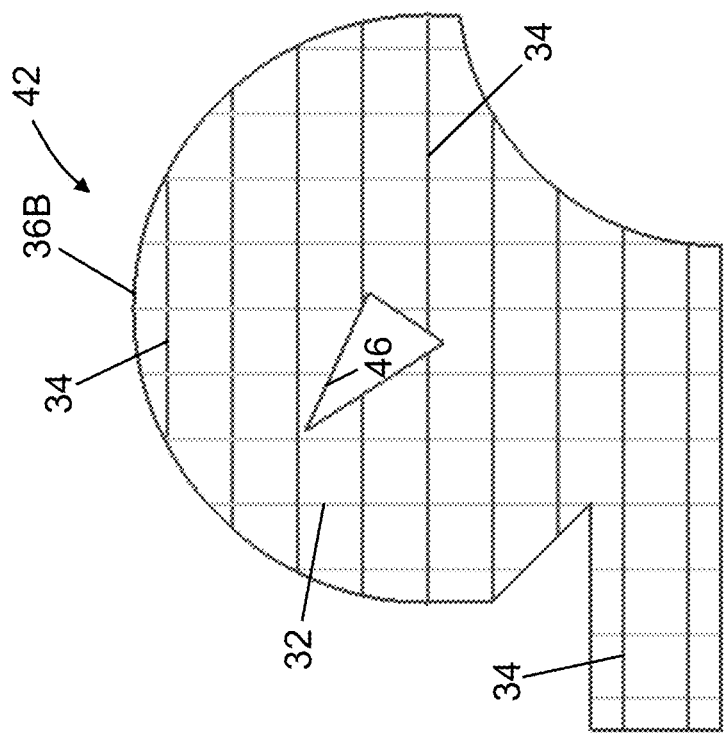
FIG. 4B is a diagram representing a projected grid pattern with a non-rectangular boundary in which the boundaries include arcs, an angle and an internal stay-out zone.
Figure 4A:
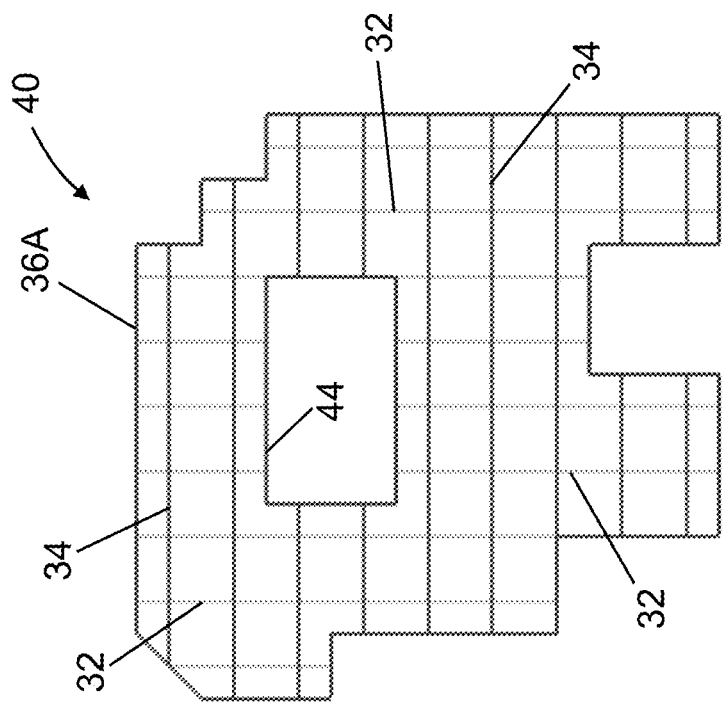
FIG. 4A is a diagram representing a projected grid pattern with a non-rectangular boundary in which the boundaries include steps, an angle and an internal stay-out zone.

The projected pattern layout is not limited to having a purely rectangular boundary. Boundaries may include one or more of the following: angles, arcs, and internal lines bounding a region where the robot should stay out. (Such a bounded region will be referred to hereinafter as a stay-out zone".) FIG. 4A shows a projected grid pattern 40 with a complex boundary in which the border 36A includes steps, an angle and a rectangular internal stay-out zone 44. The projected grid pattern 40 with a complex boundary further comprises vertical grid lines 32 and horizontal grid lines 34 which start and end at the border 36A. FIG. 4B shows a projected grid pattern 42 with a complex boundary in which the border 36B includes arcs, an angle and a triangular internal stay-out zone 46. The projected grid pattern 42 with a complex boundary further comprises vertical grid lines 32 and horizontal grid lines 34 which start and end at the border 36B.

More complex boundary configurations, such as a branching passages and mazes, are also feasible. Also, although the spacing between the horizontal grid lines 32 is depicted in FIGS. 3, 4A and 4B as being equal to the spacing between the vertical grid lines 34, those spacings need not be equal. A ratio of unequal horizontal and vertical spacings could be specified to enable different spatial resolutions along the respective axes.

The other major part of the system is a photo-sensitive device (i.e., the grid-line detection unit 16) capable of detecting impinging grid lines and other elements of the projected pattern. The digital output from the grid-line detection unit 16 can be used to determine the X-Y position and heading angle of the robot relative to the pattern, as well as other signals activated by the pattern (such as boundary indications).

FIGS. 5A through 5D are diagrams representing a top view of a solid-state grid-line detection unit 16A in accordance with one embodiment. FIGS. 5A-5D show successive positions of the grid-line detection unit 16A as it moves vertically upward relative to a pair of projected mutually perpendicular grid lines 32 and 34 which are stationary. As the grid-line detection unit 16A moves upward, the relative vertical position where grid lines 32 and 34 impinge on the grid-line detection unit 16A moves downward in the frame of reference of the grid-line detection unit 16A. In this example, the angle of rotation of grid-line detection unit 16A relative to the grid lines 32 and 34 is zero (i.e., the grid-line detection unit 16A is moving parallel to grid line 32).

In the embodiment shown in FIGS. 5A-5D, the projected light that forms horizontal grid line 34 is one color (e.g., red), while the projected light that forms vertical grid line 32 is a different color (e.g., green). The grid-line detection unit 16A in turn comprises two pairs of red photo-sensors (i.e., photo-sensor pairs 64 and 68) which detect only red light and two pairs of green photo-sensors (i.e., photo-sensor pairs 62 and 66) which detect only green light. In the example depicted in FIGS. 5A-5D, the green grid line 32 does not impinge upon the green photo-sensors of pairs 62 and 66, but as shown in FIGS. 5B and 5C, the red grid line 34 impinges on the red photo-sensors of pairs 64 and 68 as the grid-line detection unit 16A moves upward. The photo-sensors are attached to or formed in a substrate 96, which may be a printed circuit board.

In cases where the substrate 96 of the grid-line detection unit 16A is square or rectangular, the photo-sensor pairs 62, 64, 66 and 68 are preferably located at the midpoints of the respective sides of the square or rectangle proximate to an edge of the substrate 96. The photo-sensors of each pair 62, 64, 66, 68 are arranged close together to detect the direction of motion in a way which is similar how a standard quadrature positional/rotational encoder works. Existing hardware to read quadrature encoder signals can be used with this grid-line detection unit. As a grid line passes over a quadrature photo-sensor, either an X or a Y signal is recorded. Two photo-sensors are located in close proximity to each other, with a slight positional offset. The pair of sensors produce signals that are slightly offset, which are processed together (i.e., quadrature mode); this allows the direction of motion to be determined. Separate colors, along with corresponding sensors sensitive to the respective colors, are used for the horizontal and vertical grid lines to isolate the X and Y signals.

In the example depicted in FIGS. 5A-5D, the grid line 34 is depicted in four respective positions relative to the photo-sensor pairs 64 and 68 as the grid-line detection unit 16A moves vertically upward relative to the grid line 34. For the purpose of the following discussion, the upper and lower photo-sensors of pair 68 have been respectively designated as red photo-sensor 1A and red photo-sensor 1B in FIGS. 5A-5D. Similarly, the upper and lower photo-sensors of pair 64 have been respectively designated as red photo-sensor 2A and red photo-sensor 2B.

In FIG. 5A, red grid line 34 is shown at a distance from and not impinging upon either of red photo-sensors 1A and 2A (no pulses are output by the red photo-sensors). In FIG. 5B, red grid line 34 is shown concurrently impinging upon red photo-sensors 1A and 2A. As a result of the projection of grid line 34 onto red photo-sensors 1A and 2A, red photo-sensors 1A and 2A concurrently output the respective pulses depicted in an idealized fashion and identified by "1A" and "2A" in FIG. 5E. In FIG. 5C, red grid line 34 is shown concurrently impinging upon red photo-sensors 1B and 2B. As a result of the projection of red grid line 34 onto red photo-sensors 1B and 2B, red photo-sensors 1B and 2B concurrently output at a subsequent time the respective pulses depicted in an idealized fashion and identified by "1B" and "2B" in FIG. 5E. In FIG. 5D, red grid line 34 is shown at a distance from and not impinging upon either of red photo-sensors 1B and 2B (no pulses are output by the red photo-sensors).

FIG. 5E indicates the timing of the pulses generated by the red photo-sensor pairs 64 and 68 during the movement of grid-line detection unit 16A which is depicted in FIGS. 5A-5D. The quadrature signals depicted in FIG. 5E associated with photo-sensor pair 1A-1B and pair 2A-2B are output to a data acquisition device, which converts the pulses into digital data in a format acceptable to a computer that is programmed to process the digital pulse information. More specifically, the computer can be configured to convert the digital pulse information into the Y coordinate of a reference location (such as the center point) on the grid-line detection unit 16A relative to the coordinate frame of reference of the workpiece or part at the time when the red grid line 34 passed over the red photo-sensor pairs 64 and 68. In a similar manner, the quadrature signals output by the pairs of green photo-sensors (photo-sensor pair 62 at the top and photo-sensor pair 66 at the bottom) when the green light of a vertical grid line impinges thereon during horizontal movement of the grid-line detection unit 16A can be processed to determine the X coordinate at the time when the green grid line 32 passed over the green photo-sensor pairs 62 and 68. In order to make these calculations, the computer uses a pre-stored transformation matrix that transforms the coordinates of the grid-line detection unit 16A in the frame of reference of the projected grid pattern into coordinates in the frame of reference of the workpiece or part. This transformation matrix can be calculated after the projected grid pattern has been tied to known structural features of the workpiece or part, the structure of which can be represented by a CAD model stored in a non-transitory tangible computer-readable storage medium.

The X-Y tracking part of the foregoing process is similar in concept to early optical mice which used grid lines printed on a rigid mouse pad. One difference in this application is the use of a projected pattern and additional sensor pairs that enable the determination of the angle of the grid-line detection unit 16A relative to the grid lines 32 and 34 (for angles that do not approach 90 degrees).

FIGS. 6A through 6D show successive positions of the grid-line detection unit 16A as it moves vertically upward relative to grid lines 32 and 34 with a non-zero rotation angle θ. As the grid-line detection unit 16A moves upward, the red grid line 34 impinges on the red photo-sensors of pairs 64 and 68 in the following order: (1) red photo-sensor 1A (FIG. 6A); (2) red photo-sensor 1B (FIG. 6B); (3) red photo-sensor 2A (FIG. 6C); and (4) red photo-sensor 2B (FIG. 6D). FIG. 6E is a diagram indicating the timing of the quadrature signals generated by the red photo-sensor pair 1A and 1B, and pair 2A and 2B during relative movement of the red grid line 34 as depicted in FIGS. 6A through 6D. The resulting quadrature signals output by the red photo-sensor pair 1A and 1B, and pair 2A and 2B during this movement can be used to determine the rotation angle θ.

The rotation angle θ (shown in FIG. 6A) of the grid-line detection unit 16A is computed by knowing its velocity V, the red photo-sensor pair separation distance d (shown in FIG. 6A), and the time difference Δt (shown in FIG. 6E) between the pulses output by the red photo-sensors 1A and 2A as the red grid line 34 passes over those red photo-sensors on opposite sides of the grid-line detection unit 16A. The velocity V can be computed in a well-known manner based on time and distance. The equation for computing the rotation angle θ is:

$$\theta = a\tan(V\Delta t/d)$$

The angle can be computed by using either the pairs of red photo-sensors (64 and 68) or the pairs of green photo-sensors (62 and 66).

The grid-line detection unit 16A depicted in FIGS. 5A-5D and 6A-6D can be modified to include boundary line photo-sensors that are sensitive to a different color than the colors detected by the red and green photo-sensors. In the example shown in FIGS. 7A and 7B, blue photo-sensors 72a-72d that are sensitive to blue light are placed at the corners of a modified grid-line detection unit 16B, and are activated when the blue light of projected boundary line 36b impinges on the blue photo-sensor.

FIGS. 7A and 7B depict successive positions of the grid-line detection unit 16B as it moves leftward with a rotation angle of zero relative to a stationary border 36 which is being projected onto a workpiece or part. Only portions of impinging blue border 36 are shown in FIGS. 7A and 7B, to wit, a portion of horizontal boundary line 36a and a portion of vertical boundary line 36b. In FIG. 7A, the grid-line detection unit 16B is located such that the projected blue boundary lines 36a and 36b do not overlie any of the blue photo-sensors 72a-72d. The grid-line detection unit 16B is then moved leftward until the blue light of projected boundary line 36b impinges on blue photo-sensors 72a and 72d, as depicted in FIG. 7B. In response to that event, blue photo-sensors 72a and 72d output respective pulses to a data acquisition device, which converts the pulses into digital data in a format acceptable to the computer. In response to receiving digital pulse information indicative of the fact that the blue boundary line 36b—representing the leftmost limit of where the robotic apparatus should be operating—is aligned with the blue photo-sensors 72a and 72d, the computer can control the robotic apparatus so that it does not move further to the left.

When the rotation angle of the grid-line detection unit approaches 90 degrees, the time difference Δt (shown in FIG. 6E) between the pulses output by the red photo-sensors 1A and 2A as the red grid line 34 passes over approaches infinity and the angle analysis capability of the system would not work properly. If the application requires that the grid-line detection unit address larger rotation angles, one solution is to have both types of color-sensitive photo-sensors (e.g., red and green) at each location, as shown in FIG. 8.

The angle measurement process also becomes impractical for real-time usage if it gets too large (like a few seconds). Also, there is a relationship between d and the grid spacing distance D that may become a problem before the angle gets to 90 degrees. The reason for this is that signals from consecutive grid lines can be misinterpreted. If d is considerably less than D (d<<D), then the angle at which the misinterpretation problem occurs is close to 90 degrees, but if d is similar in size to D (d≈D), then a problem may occur closer to 45 degrees. In general, the constraint equation is: d<D cos θ.

Figure 8:
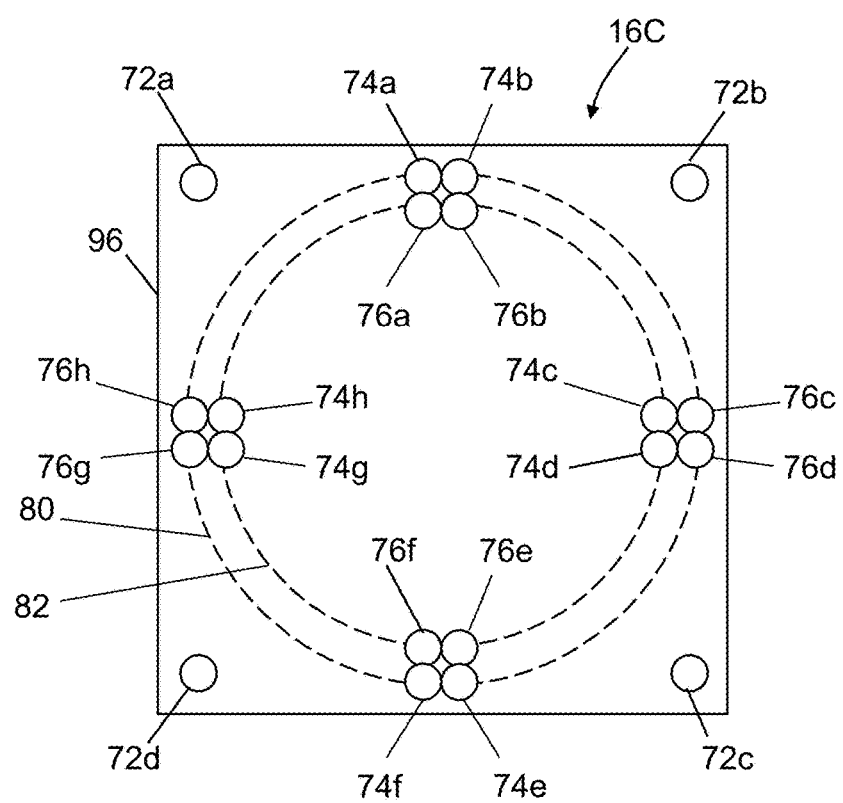
FIG. 8 is a diagram representing a top view of a grid-line detection unit designed for detecting large angles of rotation in accordance with a further embodiment.

FIG. 8 is a top view of a grid-line detection unit 16C having four blue photo-sensors 72a-72d located in respective corners, eight green photo-sensors 74a-74h, and eight red photo-sensors 76a-76h. The green and red photo-sensors are disposed along outer and inner circles 80 and 82 indicated by dashed curved lines in FIG. 8. The green photo-sensors 74a and 74b are disposed adjacent to each other along the outer circle 80 and midway between the blue photo-sensors 72a and 72b, while the red photo-sensors 76a and 76b are respectively disposed along the inner circle 82 adjacent to green photo-sensors 74a and 74b. Similarly, the green photo-sensors 74e and 74f are disposed adjacent to each other along the outer circle 80 and midway between the blue photo-sensors 72c and 72d, while the red photo-sensors 76e and 76f are respectively disposed along the inner circle 82 adjacent to green photo-sensors 74e and 74f. Conversely, the red photo-sensors 76c and 76d are disposed adjacent to each other along the outer circle 80 and midway between the blue photo-sensors 72b and 72c, while the green photo-sensors 74c and 74d are respectively disposed along the inner circle 82 adjacent to red photo-sensors 76c and 76d. Similarly, the red photo-sensors 76g and 76h are disposed adjacent to each other along the outer circle 80 and midway between the blue photo-sensors 72a and 72d, while the green photo-sensors 74g and 74h are respectively disposed along the inner circle 82 adjacent to red photo-sensors 76g and 76h. In accordance with some embodiments, during operation the tracking processing/control system would switch which set of photo-sensors are active. For example, the outer set of photo-sensors (i.e., the photo-sensors disposed along the outer circle 80) may be active normally, and then the system switches to the inner set (i.e., the photo-sensors disposed along the inner circle 82) when the heading angle is greater than +45 degrees (or less than −45 degrees).

Figure 9:
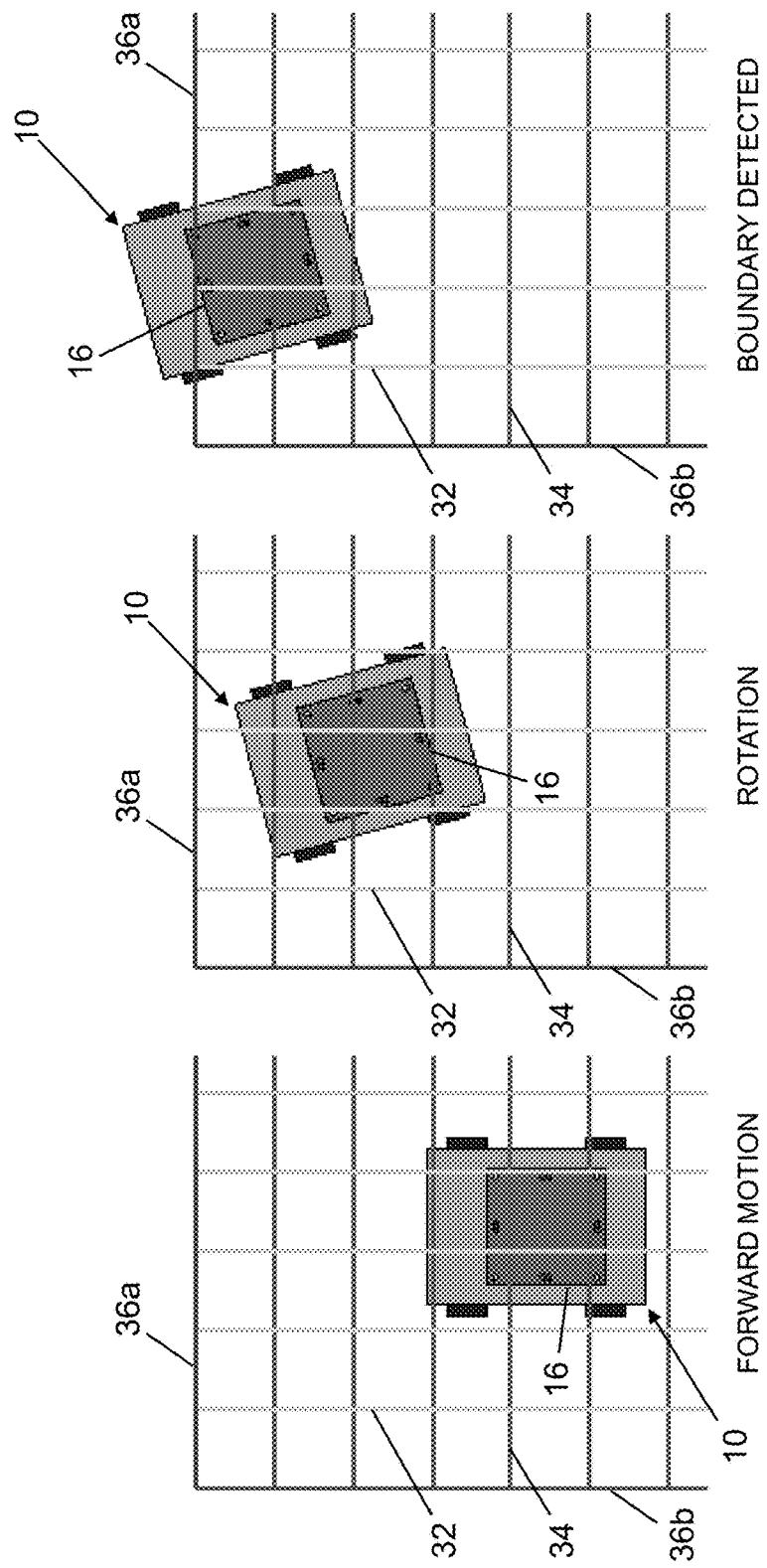
FIGS. 9A through 9C are diagrams representing respective top views of a crawler robot during a motion sequence involving forward motion (FIG. 9A), rotation (FIG. 9B), and boundary detection (FIG. 9C).

For the purpose of illustrating one category of target components, FIGS. 9A through 9C present respective top views of a crawler robot 10 during a motion sequence involving forward motion in a direction parallel to the vertical grid lines 32 (FIG. 9A), rotation (FIG. 9B), and boundary detection (FIG. 9C). The crawler robot may be a holonomic-motion crawler. However, the location tracking systems disclosed herein are equally applicable to operation of non-holonomic-motion crawler vehicles. Other categories of movable target components—the locations of which can be tracked using the technology disclosed herein—include components of other types of automated devices, such as articulated robots, and components of devices which are moved manually, not by automation.

Figure 10:
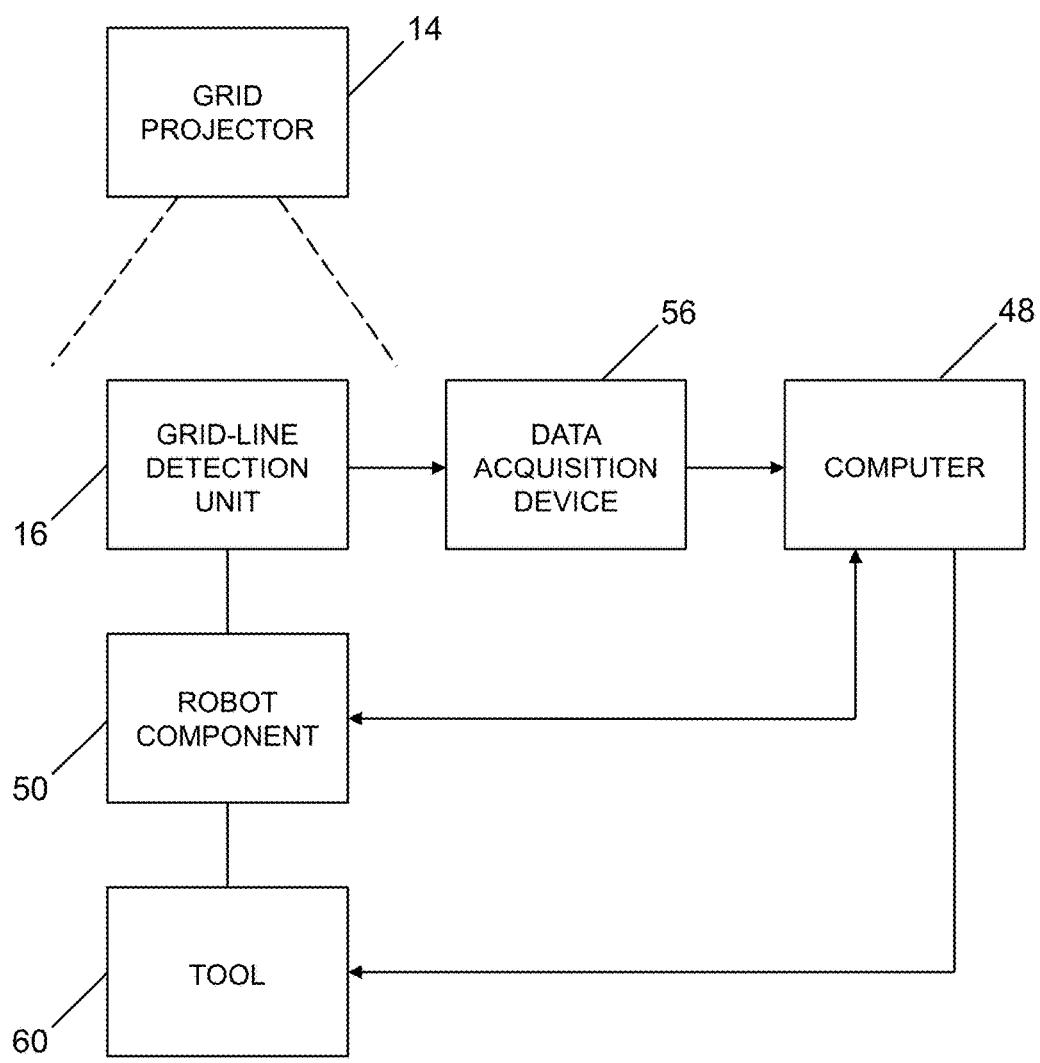
FIG. 10 is a block diagram showing an overall architecture of an automated system that incorporates robotic location tracking navigation apparatus in accordance with one embodiment.

FIG. 10 is a block diagram showing an overall architecture of an automated system that incorporates robotic location tracking navigation apparatus in accordance with one embodiment. The system depicted in FIG. 10 comprises a robot component 50 (e.g., a tool-holding frame of a crawler robot or a tool-holding end effector frame of a robotic arm) that supports a manufacturing or maintenance tool 60. Movement of the robot component 50 and operation of the tool 60 can be controlled by a computer 48. The computer 48 may comprise a general-purpose computer programmed with motion control application software comprising respective software modules for controlling movement of robot component 50 and operation of tool 60.

In accordance with the embodiment depicted in FIG. 10, a grid-line detection unit 16 is attached to the robot component 50 for intermittently providing information regarding the current location of the robot component 50. For example, the robot component 50 may comprise a head or an end effector attached to a distal end of a robotic arm or a tool-holding frame of a crawler robot, to which the tool 60 is attached. During a manufacturing or maintenance operation, the robot component 50 will be placed in contact with or adjacent to a surface of a workpiece or a part (e.g., an airplane fuselage section). The grid projector 14 projects a grid pattern onto the surface of the workpiece or part in the area where the manufacturing or maintenance operation is to be performed (i.e., by the tool 60). Several types of commercial off-the-shelf (COTS) projectors are available that would be compatible, including a standard video projector, a multi-color laser pattern projector, and a multi-color scanning laser video projector. The grid-line detection unit 16 comprises multiple pairs of photo-sensors which output pulses in response to detection of impinging light of grid lines projected by the projector 14 during movement of the robot component 50. Those pulses are output to a data acquisition device 56, which converts the pulses into digital data in a format acceptable to a computer 48. The data acquisition device 56 may comprise an existing COTS device for reading encoders and digital inputs which has encoder inputs, digital input and outputs, and a computer interface, such as USB, serial, Ethernet, etc.

To enable the grid-line detection unit 16 to track the location of the robot component 50 in the coordinate frame of reference of the workpiece or part, the grid pattern must be initially aligned with the workpiece or part. In the simplest cases involving a flat surface and rectangular projection area, the grid pattern can be tuned to have a specific number of lines in the X and Y directions. This is accomplished using a projector with an adjustable field-of-view (zoom), keystone adjustment, as well as the ability to adjust the grid pattern. By knowing the grid line spacing and the absolute location of the starting X and Y edge locations of the grid pattern, defined in terms of the coordinate frame of reference of the workpiece or part, the location of the grid-line detection unit 16 can be determined at run-time in the coordinate frame of reference of the workpiece or part. In other cases where sufficient rectangular (orthogonal) reference edges do not exist on the workpiece or part, the initial projection calibration process can be a separate step.

The pattern used for calibration does not need to be the same as the grid pattern. If the relative position and scale of the calibration and grid patterns is known, the calibration pattern can be used for setup and then the pattern can be switched to the grid pattern for run-time operation. With this type of calibration, a calibration pattern may be prepared specifically for the target area on which the pattern will be projected. For example, a calibration pattern can be created that includes three or more non-collinear points that represent known visible features on the workpiece or part. The user then adjusts the aim direction, field-of-view, and keystone of the projector 14 to align the projected points with the known features on the workpiece or part. When the calibration is complete, the user switches over to the grid pattern (the calibration points are no longer shown).

In a variation of this concept, an outline shape of the workpiece or part or some other visible portion of the workpiece or part can be used along with the pattern boundary lines for the alignment. In other variations of the concept, multiple calibration patterns can be prepared and one selected during the calibration setup to allow more flexibility during calibration. For example, a 3-D model of the workpiece or part rendered in an interactive 3-D visualization environment can be used as the image source for alignment calibration.

In another embodiment, a separate calibration system (not shown in FIG. 10) can be used, such as a local positioning system (or other type of laser tracker). In this process the user would use the local positioning system (LPS) to target and measure three feature points, with known X,Y,Z positions, that are visible on the workpiece or part, and then calibrate the LPS instrument to those points using a three-point method calibration process. In this embodiment, the projector would be attached to the LPS pan-tilt unit with a known offset (e.g., a 4×4 transformation matrix). After the LPS is calibrated, the offset is applied to the LPS calibration, resulting in calibration of the projector 14 to the workpiece or part, and by knowing the field-of-view of the projector 14, the scale of the projected grid pattern on the target can be adjusted.

Projectors exist that can produce grid lines based on programmable patterns, like the kind of controllable laser units used for laser light shows, but a more general solution is to use a laser video projector that can receive video data from a standard personal computer. This allows applications that can create standard image data to be used as the source, and makes it easier to generate the custom grid patterns needed for use with non-flat surfaces.

After the projector 14 has been calibrated to the workpiece or part, the robot component 50 is placed at a starting position such that the grid-line detection unit 16 has a known location within the projected grid pattern. This can be accomplished by placing the grid-line detection unit 16 so that a selected intersection of a vertical grid line and a horizontal grid line of the projected grid pattern is superimposed on a selected point (e.g., a reference point or mark on the unit) on the grid-line detection unit 16 and then rotating the grid-line detection unit 16 so that a selected grid line is superimposed on two selected points (e.g., two reference points) on the grid-line detection unit 16.

Once the initial location of the grid-line detection unit 16 relative to the grid pattern has been established, since the location of the grid pattern in the coordinate frame of reference of the workpiece or part is known, the initial location of the grid-line detection unit 16 in the coordinate frame of reference of the workpiece or part can be calculated. Thereafter, any movement of the robot component can be tracked based on the change in location of the grid-line detection unit relative to its initial location. This provides accurate, absolute measurement at discrete intervals.

The grid-based tracking can produce accurate location data at the grid lines, but does not produce data between the grid lines. In the case of a crawler robot, this can be addressed by using a combination of the grid-based tracking, differential odometry, and a filtering process (such as a Kalman filter) to fill in the gaps. This would enable absolute measurement at lower update rates to be integrated with an incremental motion measurement system running at higher update rates.

One example of an incremental motion measurement system is a dead-reckoning odometry-based system. In another embodiment, an inertial measurement unit can be used to provide the incremental motion measurement for the dead-reckoning process. Any dead-reckoning solution will have measurement inaccuracies due to small errors that build up over time. These can be caused by systematic errors in the device or disruptions caused by unexpected changes in the environment.

FIG. 11 is a schematic top planar view of some components of an encoder-equipped crawler robot whose incremental movements can be tracked using a dead-reckoning odometry-based process. This device has a four-omni wheel, perpendicular, double-differential configuration. This tracking device can be connected or mounted to an end effector-equipped crawler robot. The device shown in FIG. 11 comprises a rectangular frame 4 and four double-row omni wheels 4a-4d rotatably mounted to frame 4 by means of respective axles 6a-6d and axle bearings (not shown). Respective encoders 8a-8d measure rotation of the omni wheels 4a-4d. As the omni wheels roll on a surface, the encoders 8a-8d send encoder pulses representing respective encoder counts to the data acquisition device 56 (shown in FIG. 10) after each incremental rotation of each omni wheel. Each encoder will output an encoder count proportional to the angle of rotation of a respective omni wheel. These encoder pulses will be converted to digital data, which the software running on computer 48 (shown in FIG. 10) uses to compute the X and Y coordinates and the heading angle of the tracking device.

In the case of a robotic arm, all of the extendible and rotatable members of the robotic arm are typically provided with linear and rotational encoders that respectively output pulses representing incremental translation and rotation of those members during operation of the robot, which pulses can be used to provide incremental location tracking of the robot or a component thereof.

Thus the absolute measurement system (i.e., grid-line detection unit and projected grid pattern) produces position and orientation data at finite time intervals. The time interval between successive absolute measurements depends on the grid line spacing. This location of the robot component, acquired at periodic intervals when a photo-sensor of a grid-line detection unit crosses successive projected grid lines, can be continually updated based on subsequent incremental motion measurements acquired as the photo-sensor moves between those successive grid lines.

In accordance with some embodiments, the method for tracking a location of a robot component 50 (FIG. 10) of a robotic apparatus comprises: mechanically coupling a grid-line detection unit 16 having multiple photo-sensors to the robot component 50; mechanically coupling a tool to the robotic apparatus; projecting light toward the grid-line detection unit 16, the projected light being in the form of a grid pattern comprising grid lines; moving the grid-line detection unit 16 relative to the grid pattern; outputting electrical signals from the photo-sensors having characteristics representing projected light of the grid pattern sensed by individual photo-sensors during movement of the grid-line detection unit 16; and tracking a current location of the grid-line detection unit 16 relative to the grid pattern using digital data derived from the electrical signals output by the photo-sensors.

The method described in the preceding paragraph may further comprise: computing a current location of the robot component 50 relative to a frame of reference of a workpiece or part based on at least a location of the grid pattern relative to the frame of reference of the workpiece or part and a current location of the grid-line detection unit 16 relative to the grid pattern; comparing the current location of the robot component 50 to a target location of the robot component 50; causing the robot component 50 to move toward the target location; and using the tool to perform a manufacturing or maintenance operation on the workpiece or part while the robot component 50 is located at the target location.

In accordance with one embodiment, the tool is a non-destructive inspection tool that can be used to acquire non-destructive inspection data from a portion of the workpiece or part while the robot component 50 is located at the target location. In this case, the method further comprises: computing a location of the portion of the workpiece or part relative to the frame of reference of the workpiece or part based at least in part on a location of the non-destructive inspection tool relative to the robot component 50; and associating the acquired non-destructive inspection data with the computed location of the portion of the workpiece or part in a non-transitory tangible computer-readable storage medium.

In contrast to the solid-state device described above, FIG. 12 presents an isometric view of a rotating grid-line detection unit 16D with motorized oscillation in accordance with an alternative embodiment. A motor 38, which is mechanically coupled to a movable robot component, can be operated in a manner that causes the grid-line detection unit 16D to oscillate/rotate.

FIG. 12A shows a top view of the grid-line detection unit 16D. The substrate 96 of the grid-line detection unit 16D is attached to a distal end of a rotatable output shaft 54 of a motor 38. This embodiment has two linear photo-sensors 52 and 54 formed or arranged on the substrate 96 in a right-angle pattern for detecting grid lines, while the motor 38 rotates the grid-line detection unit 16D back and forth ±45 degrees (passing each time through a 0-degree angular position relative to the robot component) quickly for multiple cycles (e.g., 30 Hz) in the time that it takes the grid-line detection unit 16D to move from one grid line to the next. As the motor 38 oscillates the grid-line detection unit 16D back and forth, the linear photo-sensors 52 and 54 detect the presence of any impinging light from projected grid lines, and at the instant in which intersecting grid lines 32 and 34 overlie and align with the linear photo-sensors 52 and 54 (as shown in FIGS. 12B and 12D), pulses are output to the data acquisition device (see FIG. 10). At the same time, the relative angle between the motor 38 and the robot is being measured with a rotational encoder (not shown in the drawings) mounted on the motor 38. The rotational encoder also outputs pulses to the data acquisition device. Thus the angular position of the grid-line detection unit 16D relative to the robot component at the time when linear photo-sensors 52 and 54 concurrently output pulses can be determined by the computer 48 (see FIG. 10). The pulses output by the linear photo-sensors 52 and 54 and by the rotational encoder of the motor provide information that enables the computer to track the location (i.e., position and orientation) of the grid-line detection unit 16D in the coordinate frame of reference of the grid pattern. Thereafter the computer can calculate the location of the end effector of the robot (e.g., a crawler robot, a robotic arm, etc.) in the coordinate frame of reference of the workpiece or part based on the aforementioned transformation matrix. This configuration allows acquisition of the X-Y position and heading angle of the robot component with just three encoders (i.e., the motor rotational encoder and two linear photo-sensors) and an oscillating motor.

For example, FIG. 12B shows the grid-line detection unit 16D at an instant in time when two projected grid lines 32 and 34 are respectively aligned with the linear photo-sensors 52 and 54. FIG. 12C shows the grid-line detection unit 16D after the robot has rotated relative to the projected grid pattern. It should be understood that the grid lines 32 and 34 shown in FIGS. 12A through 12D are stationary during operation of the system. FIG. 12C shows the relative angular positions of the grid-line detection unit 16D and the grid lines 32 and 34 after the robot component (on which the motor of the rotating grid-line detection 16D unit is mounted) has been rotated. Any rotation of the robot component cause the 0-degree angular position of the grid-line detection unit 16D to be rotated relative to the stationary grid lines 32 and 34. Thereafter, the system can determine the new angular position of the robot component in the frame of reference of the workpiece or part by causing the grid-line detection unit 16D to oscillate/rotate. FIG. 12D shows the grid-line detection unit 16D at an instant in time during oscillation/rotation when grid lines 32 and 34 are again respectively aligned with the linear photo-sensors 52 and 54. In conjunction with the rotational encoder output, the computer can determine the current location of the robot component in the frame of reference of the workpiece or part.

Disregarding the boundary lines, the grid patterns 30, 40 and 42 previously described with reference to FIGS. 3, 4A and 4B respectively are uniform in the sense that the pattern of the intersecting vertical and horizontal grid lines does not vary inside the boundary line. These uniform grid patterns can be used to provide the system with location results in Cartesian coordinates. However, there may be some situations in which useful results can be achieved for non-Cartesian grid patterns.

Figure 13:
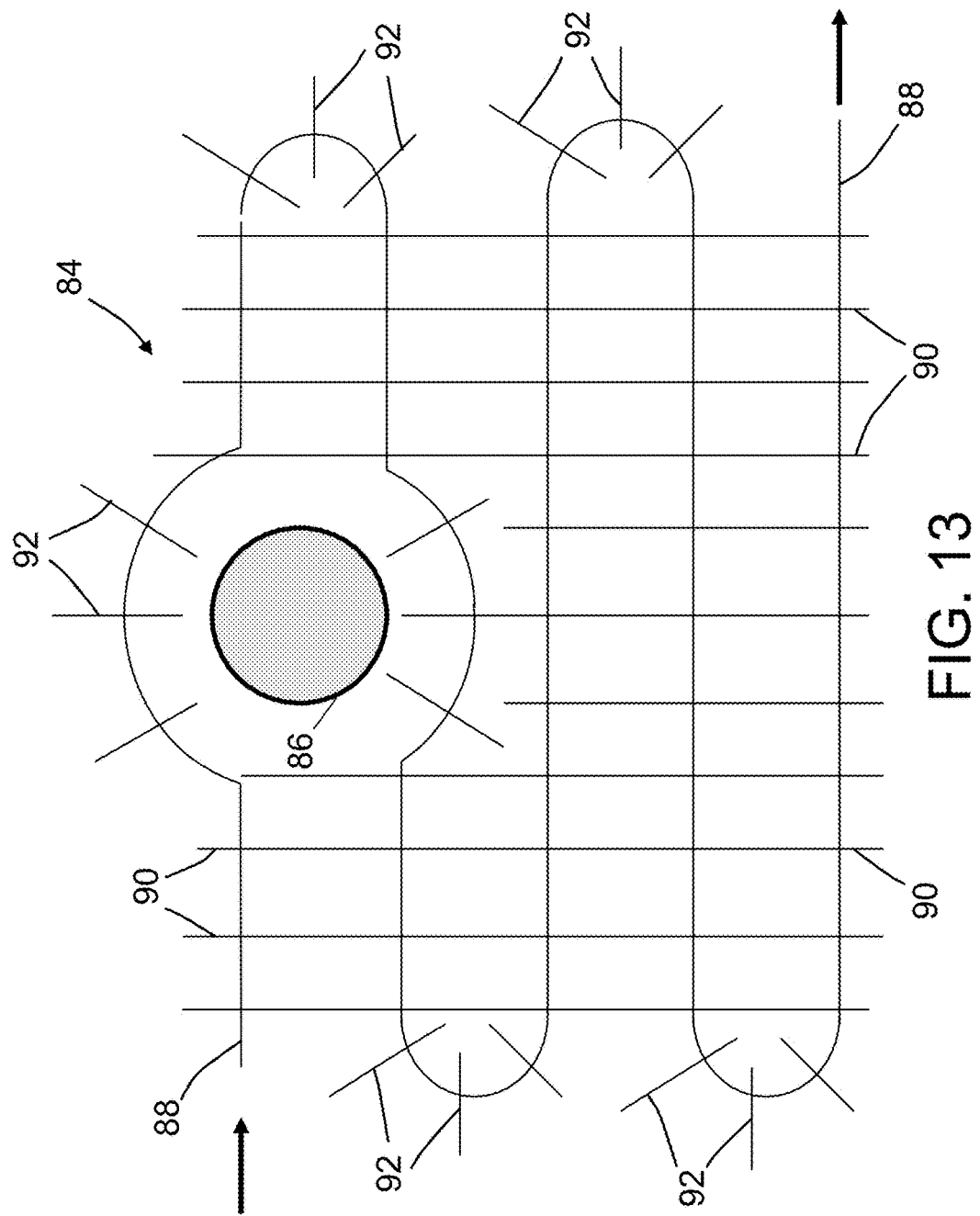
FIG. 13 is a diagram representing a top view of a grid pattern that incorporates a track for guiding a crawler robot or robotic arm around a structural feature to be avoided.

FIG. 13 is a diagram representing a top view of a non-uniform projected grid pattern 84 that incorporates a guide path 88 for guiding a crawler robot or robotic arm (not shown) around a structural feature 86 (on the workpiece or part) to be avoided. The guide path 88 for guiding the robotic crawler or arm is projected onto the workpiece or part. The grid-line detection unit (not shown in FIG. 13) determines the orientation of the robotic crawler or arm relative to the guide path 88. In this way, features to be avoided can be driven around. The grid pattern 84 can be automatically generated using a model or an image of the surface to be inspected, with the technician making minor changes to the track as needed.

In the embodiment depicted in FIG. 13, the guide path 88 comprises straight segments and circular segments. The grid pattern 84 further comprises a multiplicity of mutually parallel straight vertical grid lines 90 which intersect the straight segments of guide path 88 and a multiplicity of straight radial grid lines 92 which intersect the circular segments of guide path 88. As the robotic crawler or arm (or a portion thereof) travels along the guide path 88, its distance along the guide path 88 can be determined from the pulses output by photo-sensors of the grid-line detection unit in response to detection of each vertical grid line 90 or radial grid line 92 in sequence. The location results for this example would not be in Cartesian space, but instead are a "parametric representation". In the case depicted in FIG. 13, there is one parameter, which describes the distance along this non-branching guide path. If an equation for the curve described in Cartesian space is known, then it would be possible to plug in the parametric distance and convert that into a Cartesian location. In some use cases it might not be necessary to obtain Cartesian coordinates; in others it would be.

The foregoing is an example of one possible parametric representation that has one independent variable. To extend this concept further, the projected grid pattern may comprise a plurality of parallel guide paths in the direction of travel.

FIG. 14 is a diagram representing a top view of a non-uniform grid pattern 94 that incorporates a plurality of parallel guide paths 88a-88e for guiding a crawler robot or robotic arm (not shown) around a structural feature 86 (on the workpiece or part) to be avoided. In the embodiment depicted in FIG. 14, each guide path 88a-88e comprises parallel straight segments and concentric circular segments. The grid pattern 94 further comprises a multiplicity of mutually parallel straight vertical grid lines 90 which intersect the straight segments of guide paths 88a-88e and a multiplicity of straight radial grid lines 92 which intersect the circular segments of guide paths 88a-88e. As the robotic crawler or arm (or a portion thereof) travels along one of the guide paths 88a-88e, its distance along the guide path can be determined from the pulses output by photo-sensors of the grid-line detection unit in response to detection of each vertical grid line 90 or radial grid line 92 in sequence.

The grid pattern 94 depicted in FIG. 14 would provide two parametric variables that could be used to provide location long the path—and again, if the equation for the curves can be described in Cartesian space, then it would be possible to convert the parametric position information into a Cartesian position.

While systems and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit).

As used herein, the term "location" comprises position in a fixed three-dimensional coordinate system and orientation relative to that coordinate system.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A system comprising:
a movable target component;
a projector configured to project a stationary grid pattern comprising intersecting grid lines and located to project the stationary grid pattern toward the movable target component, wherein the intersecting grid lines comprise a first multiplicity of grid lines formed by first light and a second multiplicity of grid lines formed by second light;
a grid-line detection unit mechanically coupled to the movable target component, the grid-line detection unit comprising a plurality of photo-sensors, each photo-sensor being configured to output a signal when an impinging grid line is detected, wherein the plurality of photo-sensors comprise first through fourth photo-sensors that detect the first light and do not detect the second light, and fifth through eight photo-sensors that detect the second light and do not detect the first light, the first and second photo-sensors being disposed adjacent to each other and away from the other photo-sensors, the third and fourth photo-sensors being disposed adjacent to each other, away from the other photo-sensors and opposite to the first and second photo-sensors, the fifth and sixth photo-sensors being disposed adjacent to each other and away from the other photo-sensors, and the seventh and eighth photo-sensors being disposed adjacent to each other, away from the other photo-sensors and opposite to the fifth and sixth photo-sensors;
a data acquisition device to convert the signals from the plurality of photo-sensors into signal data in a digital format; and
a computer system configured to calculate a location of the movable target component based on the signal data from the data acquisition device.

2. The system as recited in claim 1, wherein the computer system is further configured to control movement of the movable target component as a function of the calculated location of the movable target component.

3. The system as recited in claim 1, wherein the grid pattern comprises a multiplicity of boundary grid lines that form a border surrounding the intersecting grid lines, the boundary grid lines being formed by third light.

4. The system as recited in claim 3, wherein the first through eight photo-sensors do not detect the third light, and the grid-line detection unit further comprises ninth through twelfth photo-sensors that detect the third light and do not detect the first and second light.

5. The system as recited in claim 1, wherein the movable target component comprises a robot component.

6. The system as recited in claim 5, wherein the robot component supports a tool.

7. The system as recited in claim 6, wherein the computer system is further configured to control movement of the robot component as a function of the calculated location of the robot component and control operation of the tool.

8. The system as recited in claim 5, wherein the robot component is a tool-holding frame of a crawler robot or a tool-holding end effector frame of a robotic arm.

9. The system as recited in claim 1, wherein the first light is visible, ultraviolet or infrared light.

10. The system as recited in claim 1, wherein the first light includes light in a first wavelength range and the second light includes light in a second wavelength range that does not overlap the first wavelength range.

11. The system as recited in claim 1, wherein the first light and second light are the same color, but have different pulsed frequencies.

12. The system as recited in claim 1, wherein the first light and second light are different colors.

13. An apparatus comprising a movable target component, a tool mechanically coupled to the movable target component, and a grid-line detection unit mechanically coupled to the movable target component, wherein the grid-line detection unit comprises a substrate, first through fourth photo-sensors that detect first light and do not detect second light, and fifth through eight photo-sensors that detect the second light and do not detect the first light, the first and second photo-sensors being disposed adjacent to each other on a surface of the substrate and away from the other photo-sensors, the third and fourth photo-sensors being disposed adjacent to each other on the surface of the substrate, away from the other photo-sensors and opposite to the first and second photo-sensors, the fifth and sixth photo-sensors being disposed adjacent to each other on the surface of the substrate and away from the other photo-sensors, and the seventh and eighth photo-sensors being disposed adjacent to each other on the surface of the substrate, away from the other photo-sensors and opposite to the fifth and sixth photo-sensors.

14. The apparatus as recited in claim 13, wherein the first through eight photo-sensors do not detect third light and the grid-line detection unit further comprises ninth through twelfth photo-sensors that detect the third light and do not detect the first and second light.

15. The apparatus as recited in claim 14, wherein the substrate has first through fourth sides which intersect at first through fourth corners, the ninth through twelfth photo-sensors being disposed in the first through corners respectively.

16. The apparatus as recited in claim 15, wherein the first and second photo-sensors are disposed adjacent the first side of the substrate midway between the ninth and tenth photo-sensors, and the third and fourth photo-sensors are disposed adjacent the second side of the substrate midway between the eleventh and twelfth photo-sensors, the second side of the substrate being opposite the first side of the substrate.

17. The apparatus as recited in claim 13, wherein the movable target component comprises a robot component.

18. The apparatus as recited in claim 17, wherein the robot component supports a manufacturing or maintenance tool.

19. The apparatus as recited in claim 17, wherein the robot component is a tool-holding frame of a crawler robot or a tool-holding end effector frame of a robotic arm.

20. The apparatus as recited in claim 13, wherein the light is visible, ultraviolet or infrared light.

21. A crawler robot comprising:
a frame; and
a grid-line detection unit mechanically coupled to the frame, the grid-line detection unit comprising a substrate, first through fourth photo-sensors that detect first light and do not detect second light, and fifth through eight photo-sensors that detect the second light and do not detect the first light.

22. The crawler robot as recited in claim 21, further comprising a plurality of encoder wheels arranged in a four-omni wheel, perpendicular, double-differential configuration.

23. The crawler robot as recited in claim 21, wherein the first and second photo-sensors are disposed adjacent to each other on a surface of the substrate and away from the other photo-sensors, the third and fourth photo-sensors are disposed adjacent to each other on the surface of the substrate, away from the other photo-sensors and opposite to the first and second photo-sensors, the fifth and sixth photo-sensors are disposed adjacent to each other on the surface of the substrate and away from the other photo-sensors, and the seventh and eighth photo-sensors being are disposed adjacent to each other on the surface of the substrate, away from the other photo-sensors and opposite to the fifth and sixth photo-sensors.

* * * * *